(12) United States Patent
Kaplan et al.

(10) Patent No.: US 9,227,877 B2
(45) Date of Patent: Jan. 5, 2016

(54) CERAMIC NANOCOMPOSITE MATERIAL AND METHOD OF MANUFACTURING THEREOF

(71) Applicant: TECHNION RESEARCH & DEVELOPMENT FOUNDATION LIMITED, Haifa (IL)

(72) Inventors: Wayne David Kaplan, Kiryat Tivon (IL); Gali Gluzer, Haifa (IL); Moshe Katz, Kiryat Bialik (IL); Gil Perlberg, Zichron Yaakov (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 14/456,473

(22) Filed: Aug. 11, 2014

(65) Prior Publication Data

US 2014/0349832 A1    Nov. 27, 2014

Related U.S. Application Data

(62) Division of application No. 13/202,360, filed as application No. PCT/US2010/024420 on Feb. 17, 2010, now Pat. No. 8,802,244.

(60) Provisional application No. 61/153,791, filed on Feb. 19, 2009, provisional application No. 61/252,760, filed on Oct. 19, 2009.

(51) Int. Cl.
*C04B 35/64*   (2006.01)
*C04B 35/117*  (2006.01)
(Continued)

(52) U.S. Cl.
CPC ............... *C04B 35/64* (2013.01); *C04B 35/10* (2013.01); *C04B 35/117* (2013.01);
(Continued)

(58) Field of Classification Search
CPC  C04B 41/45; C04B 41/4545; C04B 41/4549; C04B 41/50; C04B 41/5007; C04B 41/5025; C04B 35/117; C04B 35/119; C04B 35/488; C04B 35/4885; C04B 2235/30
USPC ........... 428/325, 457, 472, 472.1, 472.2, 688, 428/689, 698, 699
See application file for complete search history.

(56) References Cited

U.S. PATENT DOCUMENTS 5,130,277 A    7/1992  Ueda et al.
5,230,924 A    7/1993  Li
(Continued)

OTHER PUBLICATIONS

Tani et al. "SiC matrix composites reinforced with internally synthesized $TiB_2$", Journal of Materials Science, Jan. 1990, pp. 157-160, vol. 25, No. 1.
(Continued)

*Primary Examiner* — Noah Wiese
(74) *Attorney, Agent, or Firm* — Pearl Cohen Zedek Latzer Baratz LLP (57) ABSTRACT

Ceramic nanocomposites and methods for manufacturing the ceramic nanocomposites are disclosed. One method includes introducing to a fired green ceramic body having a ceramic matrix submicron particles having coefficient of thermal expansion lower than the coefficient of thermal expansion of the ceramic matrix and at least one type of location-controlling dopant at an amount that is sufficient to cover the majority of the ceramic matrix grain boundaries. One ceramic nanocomposite includes a ceramic matrix with submicron particles dispersed in the ceramic matrix, the submicron particles having a coefficient of thermal expansion lower than the coefficient of thermal expansion of the ceramic matrix and at least one dopant that covers the majority of the ceramic matrix grain boundaries, at a concentration that does not exceed the bulk solubility limit of the dopant in the ceramic matrix at the ceramic nanocomposite sintering temperature.

20 Claims, 4 Drawing Sheets

(51) Int. Cl.
*C04B 35/119* (2006.01)
*C04B 35/563* (2006.01)
*C04B 35/565* (2006.01)
*C04B 35/584* (2006.01)
*C04B 35/10* (2006.01)

(52) U.S. Cl.
CPC ............ *C04B 35/119* (2013.01); *C04B 35/563* (2013.01); *C04B 35/565* (2013.01); *C04B 35/584* (2013.01); C04B 2235/3206 (2013.01); C04B 2235/3208 (2013.01); C04B 2235/3222 (2013.01); C04B 2235/3232 (2013.01); C04B 2235/3248 (2013.01); C04B 2235/3279 (2013.01); C04B 2235/3418 (2013.01); C04B 2235/3463 (2013.01); C04B 2235/3821 (2013.01); C04B 2235/3826 (2013.01); C04B 2235/3843 (2013.01); C04B 2235/3873 (2013.01); C04B 2235/401 (2013.01); C04B 2235/402 (2013.01); C04B 2235/404 (2013.01); C04B 2235/405 (2013.01); C04B 2235/407 (2013.01); C04B 2235/408 (2013.01); C04B 2235/428 (2013.01); C04B 2235/5445 (2013.01); C04B 2235/616 (2013.01); C04B 2235/658 (2013.01); C04B 2235/786 (2013.01); C04B 2235/85 (2013.01); C04B 2235/9615 (2013.01)

(56) References Cited

U.S. PATENT DOCUMENTS

| | | | |
|---|---|---|---|
| 5,418,197 A | 5/1995 | Brandt | |
| 5,835,841 A | 11/1998 | Yamada et al. | |
| 6,503,572 B1 * | 1/2003 | Waggoner | C04B 35/565 427/228 |
| 6,919,127 B2 * | 7/2005 | Waggoner | C04B 35/565 428/294.4 |
| 2003/0092558 A1 * | 5/2003 | Aghajanian | F41H 5/0435 501/91 |
| 2004/0065868 A1 * | 4/2004 | Aghajanian | C04B 35/565 252/500 |

OTHER PUBLICATIONS

Yumin Zhang et al. "Large-scale fabrication of lightweight Si/SiC ceramic composite optical mirror", Center for Composite Materials, Harbin Institute of Technology, Science Direct, Materials Letter, Sep. 3, 2003, pp. 1204-1208, vol. 58, China.

T. Ohji et al., "Strengthening and toughening mechanisms of ceramic nanocomposites", Journal of the American Ceramic Society, Jun. 1998, pp. 14553-1460, vol. 81, No. 6.

R. Kolhe et al., "Residual thermal stresses and calculation of the critical metal particle size for interfacial crack extension in metal-ceramic matrix composites", Acta Materialia, Jan. 1996, pp. 279-287, vol. 44, No. 1.

M. Lieberthal et al., "Processing and properties of $Al_2O_3$ nanocomposites reinforced with sub-micron Ni and $NiAl_2O_4$", Materials Science and Engineering a—Structural Materials Properties Microstructure and Processing, Apr. 15, 2001, pp. 83-91, vol. 302, No. 1.

O. Aharon et al., "Residual stresses and magnetic properties of alumina-nickel nanocomposites", Scripta Materialia, May 2004, pp. 1209-1213, vol. 50, No. 9.

I. Levin et al., "Effect of SiC Submicrometer Particle-Size and Content on Fracture-Toughness of Alumina-SiC Nanocomposites", Journal of the American Ceramic Society, Jan. 1995, pp. 254-256, vol. 78, No. 1.

I. Levin et al., "Residual-Stresses in Alumina-SiC Nanocomposites", Acta Metallurgica Et Materialia, Jan. 1994, pp. 1147-1154, vol. 42, No. 4.

S. I. Bae et al., "Critical Concentration of MgO for the Prevention of Abnormal Grain Growth in Alumina", Journal of the American Ceramic Society, Oct. 1994, pp. 2499-2504, vol. 77, No. 10.

D. R. Clarke, "On the Equilibrium Thickness of intergranular Glass Phases in Ceramic Materials", Journal of the American Ceramic Society, Jan. 1987, pp. 15-22, vol. 70, No. 1.

A Avishai et al., "Intergranular Films at metal-ceramic Interfaces Part I—interface structure and chemistry", Acta Materialia, Jan. 2005, pp. 1559-1569, vol. 53, No. 5.

A. Avishai et al., "Intergranular films in metal-ceramic composites and the promotion of metal particle occlusion", Zeitschrift Fur Metallkunde, Jan. 2004, pp. 226-270, vol. 95, No. 4.

* cited by examiner

CERAMIC NANOCOMPOSITE MATERIAL AND METHOD OF MANUFACTURING THEREOF

CROSS-REFERENCE TO RELATED APPLICATIONS

This application is a divisional application of U.S. application Ser. No. 13/202,360, filed Nov. 23, 2011, which in turn is a National Phase Application of PCT International Application No. PCT/US2010/024420, International Filing Date Feb. 17, 2010, which claims the benefit of U.S. Provisional Patent Application No. 61/153,791, filed Feb. 19, 2009, and U.S. Provisional Patent Application No. 61/252,760, filed Oct. 19, 2009, all of which are incorporated by reference in their entirety.

TECHNOLOGY FIELD

Some of the disclosed embodiments relate to the field of advanced ceramics, and in particular, to ceramics reinforced with submicron particles.

BACKGROUND

Ceramics have a polycrystalline microstructure possessing superior mechanical properties and in particular strength, wear resistance and stability in aggressive and high temperature environments. These mechanical properties make ceramics a desired material for the production of many applications, such as armor, lining of wear and friction surfaces, metal cutting tools, and many other industrial, medical and abrasive applications.

A wider use of ceramics, and in particular alumina, is limited by the fact that it is brittle, which is a general problem common to all ceramics. For example, the fracture strength in bending of conventional alumina ranges from 250-400 MPa. Worse, the Weibull modulus is often low, meaning a large variation in the mechanical strength.

In order to increase the fracture strength of ceramics, secondary materials, such as graphite fibers or silicon carbide fibers, are dispersed throughout the ceramic matrix.

Nano-composites, where ceramics act as a matrix and the reinforcing phase is made of submicron metal particles, such as Ni, Ti, Cu, Cr, Co, Mo, W, etc., or ceramics particles, such as SiC, $ZrC>2$, $B_4C$, WC etc., are also known in the art.

Several preparation methods, such as simple powder mixing, oxide reduction, and salt infiltration exist to prepare ceramic matrix nanocomposite. Sintering can be done by pressureless sintering, hot pressing, hot isostatic pressing (HIP), spark plasma sintering (SPS) and other methods.

It has been experimentally shown that crack formation and/or propagation in ceramic nanocomposite can be retarded by stress fields which arise from the mismatch in the coefficient of thermal expansion (CTE) between the matrix and the submicron particles. Flaws at grain boundaries or in the ceramic grains, which expand, are a major source of cracks and, thus, of mechanical failure in ceramics. It is known that if the growth and/or motion of flaws at grain boundaries or in the ceramic grains is retarded, the ceramics' strength and wear resistance will increase.

The submicron or nanometer length-scale reinforcing particles are typically randomly located within the ceramic matrix. Some of the particles are occluded within the grains of the ceramic matrix, while other particles may be located along the grain boundaries or at multi-grain junctions. Occluded particles with a coefficient of thermal expansion greater than that of the matrix material may reduce the matrix strength. For example, Ni particles occluded in an alumina matrix grain; Fe particles occluded in an alumina matrix grain; or Cu particles occluded in an alumina matrix grain.

BRIEF SUMMARY

In some of the disclosed embodiments, a ceramic nanocomposite featuring improved strength and wear resistance properties is manufactured by controlling the location and dispersion of submicron particles within the microstructure. The location of the majority of the submicron particles is controlled by at least one location-controlling dopant that is added to the ceramic nanocomposite during its manufacturing process. In some of the disclosed embodiments, the amount of location-controlling dopant that is added is sufficient to create approximately a monolayer of excess of the ceramic matrix grain boundaries and of the interfaces between the submicron particles and the ceramic matrix grains, but less than the amount that would result in a concentration that exceeds the bulk solubility limit of the location-controlling dopant ions in the ceramic matrix, at the ceramic nanocomposite sintering temperature.

In one embodiment, the ceramic nanocomposite is reinforced with submicron particles having a CTE larger than the CTE of the ceramic matrix; in this embodiment, the submicron particles are located primarily at the grain boundaries and at multiple grain junctions. In another embodiment, the ceramic nanocomposite is reinforced with submicron particles having a CTE smaller than the CTE of the ceramic matrix; in this embodiment, most of the submicron particles are occluded within the grains of the ceramic nanocomposite.

Implementations of the disclosed embodiments involve performing or completing selected tasks or steps manually, semi-automatically, fully automatically, and/or a combination thereof. Moreover, features of the embodiments may be combined.

In one embodiment, a method for manufacturing a ceramic nanocomposite, comprising: receiving a fired green ceramic body comprising ceramic matrix; introducing to the fired green ceramic body submicron particles, having coefficient of thermal expansion greater than the coefficient of thermal expansion of the ceramic matrix; and introducing at least one type of location-controlling dopant at an amount that is sufficient to cover the majority of the ceramic matrix grain boundaries, as well as the majority of the interfaces between the submicron particles and the ceramic matrix grains. Optionally, the amount of the at least one type of location-controlling dopant does not result in a concentration that exceeds the bulk solubility limit of the location-controlling dopant ions in the ceramic matrix, at the ceramic nanocomposite sintering temperature. Optionally, the method further comprises drying the fired green ceramic body after introducing the submicron particles and the location-controlling dopant. Optionally, the method further comprises sintering the fired green ceramic body after the step of drying the fired green ceramic body. Optionally, the method further comprises sintering the fired green ceramic body while controlling the oxygen partial pressure in the sintering atmosphere. Optionally, the volumetric concentration of the submicron particles is between 0.5 vol. % and 10 vol. %. Optionally, the volumetric concentration of the submicron particles is between 3 vol. % and 6 vol. %.

In one embodiment, a method for manufacturing a ceramic nanocomposite, comprising: receiving a fired green ceramic body comprising ceramic matrix; introducing to the fired green ceramic body submicron particles, having coefficient of thermal expansion lower than the coefficient of thermal expansion of the ceramic matrix; and introducing at least one type of location-controlling dopant at an amount that is sufficient to cover the majority of the ceramic matrix grain boundaries. Optionally, the amount of the at least one type of location-controlling dopant does not result in a concentration that exceeds the bulk solubility limit of the location-controlling dopant ions in the ceramic matrix, at the ceramic nanocomposite sintering temperature. Optionally, the method further comprises drying the fired green ceramic body after introducing the submicron particles and the location-controlling dopant. Optionally, the method further comprises sintering the fired green ceramic body after the step of drying the fired green ceramic body. Optionally, the volumetric concentration of the submicron particles is between 0.5 vol. % and 10 vol. %. Optionally, the volumetric concentration of the submicron particles is between 3 vol. % and 6 vol. %.

In one embodiment, a method for manufacturing a ceramic nanocomposite, comprising: receiving a fired green ceramic body comprising ceramic matrix; introducing to the fired green ceramic body submicron particles, having coefficient of thermal expansion lower than the coefficient of thermal expansion of the ceramic matrix; and introducing at least one type of location-controlling dopant at an amount that is sufficient to create an intergranular film (IGF) that covers the majority of the ceramic matrix grain boundaries and the majority of the submicron particles. Optionally, the amount of the at least one type of location-controlling dopant does not result in a concentration that exceeds the bulk solubility limit of the location-controlling dopant ions in the ceramic matrix, at the ceramic nanocomposite sintering temperature. Optionally, the method further comprises drying the fired green ceramic body after introducing the submicron particles and the location-controlling dopant. Optionally, the method further comprises sintering the fired green ceramic body after the step of drying the fired green ceramic body. Optionally, the method further comprises sintering the fired green ceramic body while controlling the oxygen partial pressure in the sintering atmosphere.

In one embodiment, a ceramic nanocomposite comprising: a ceramic matrix with submicron particles dispersed in the ceramic matrix; the submicron particles have a coefficient of thermal expansion greater than the coefficient of thermal expansion of the ceramic matrix, and at least one dopant that covers the majority of the ceramic matrix grain boundaries, at a concentration that does not exceed the bulk solubility limit of the dopant in the ceramic matrix at the ceramic nanocomposite sintering temperature; wherein a majority of the submicron particles are located at the ceramic matrix grain boundaries. Optionally, the at least one dopant is characterized by its ability to affect the location of the submicron particles within the ceramic matrix during the manufacturing process of the ceramic nanocomposite. Optionally, the at least one dopant is MgO. Optionally, the ceramic matrix is alumina. Optionally, the alumina matrix comprises a microstructure of alumina grains with average grain larger than 0.5 micron. Optionally, the at least one dopant is selected from a group of Si and Ce. Optionally, the ceramic matrix is selected from a group of SiC, and B4C. Optionally, 75% to 97% of the submicron particles are located at the ceramic matrix grain boundaries. Optionally, 60% to 97% of the submicron particles are located at the ceramic matrix grain boundaries. Optionally, the submicron particles are selected from a group of Ni, and Ti. Optionally, the submicron particles are selected from a group of Co, W, Fe, Cu, Cr, Pt, or a combination thereof. Optionally, the submicron particles are intermetallic particles. Optionally, the submicron particles comprise two or more material types. Optionally, the concentration of submicron particles in the ceramic nanocomposite is between 0.5 vol. % and 10 vol. %. Optionally, the submicron particle size is between 5 and 1000 nanometer. Optionally, the ceramic matrix comprises a microstructure of grains with average ceramic matrix grain larger than 0.5 micron. Optionally, the at least one dopant is at an amount that is sufficient to cover the majority of the ceramic matrix grain boundaries and the majority of the interfaces between the submicron particles and the ceramic matrix grains. Optionally, the at least one dopant is at an amount that is sufficient to create an equilibrium excess of the dopant at the ceramic matrix grain boundaries and at the interfaces between the submicron particles and the ceramic matrix grains, without exceeding the bulk solubility limit of the dopant in the ceramic matrix at the ceramic nanocomposite sintering temperature. Optionally, the at least one dopant is a location-controlling dopant.

In one embodiment, a ceramic nanocomposite comprising: a ceramic matrix with submicron particles dispersed in the ceramic matrix; the submicron particles have a coefficient of thermal expansion lower than the coefficient of thermal expansion of the ceramic matrix; and at least one dopant that covers the majority of the ceramic matrix grain boundaries, at a concentration that does not exceed the bulk solubility limit of the dopant in the ceramic matrix at the ceramic nanocomposite sintering temperature, and wherein a majority of the submicron particles are occluded in the ceramic matrix grains. Optionally, the at least one dopant is characterized by its ability to affect the location of the submicron particles within the ceramic matrix during the manufacturing process of the ceramic nanocomposite. Optionally, the at least one dopant is Si and/or Ca. Optionally, the ceramic matrix is alumina. Optionally, the alumina matrix comprises a microstructure of alumina grains with average grain larger than 0.5 micron. Optionally, the ceramic matrix is selected from a group of SiC, $Si_3N_4$ and $B_4C$, and the at least one dopant is oxygen. Optionally, 75% to 97% of the submicron particles are occluded within the ceramic matrix grains. Optionally, 60% to 97% of the submicron particles are occluded within the ceramic matrix grains. Optionally, the submicron particles are selected from a group of W, and Mo. Optionally, the submicron particles are selected from a group of SiC, $Si_3N_4$, mullite, $TiO_2$, $ZrSiO_4$, TiC, $B_4C$, or a combination thereof. Optionally, the submicron particles are intermetallic particles. Optionally, the submicron particles comprise two or more material types. Optionally, the concentration of submicron particles in the ceramic nanocomposite is between 0.5 vol. % and 10 vol. %. Optionally, the submicron particles size is between 5 and 1000 nanometer. Optionally, the ceramic matrix comprises a microstructure of grains with average ceramic matrix grain larger than 0.5 micron. Optionally, the at least one dopant is at an amount that is sufficient to cover the majority of the ceramic matrix grain boundaries and the majority of the interfaces between the submicron particles and the ceramic matrix grains. Optionally, the at least one dopant is at an amount that is sufficient to create an equilibrium excess of the dopant at the ceramic matrix grain boundaries and at the interfaces between the submicron particles and the ceramic matrix grains, without exceeding the bulk solubility limit of the dopant in the ceramic matrix at the ceramic nanocomposite sintering temperature. Optionally, the at least one dopant is a location-controlling dopant.

In one embodiment, a ceramic nanocomposite comprising: a ceramic matrix with submicron particles dispersed in the ceramic matrix; the submicron particles have a coefficient of thermal expansion lower than the coefficient of thermal expansion of the ceramic matrix; and at least one dopant at an amount that is sufficient to create an intergranular film that covers the majority of the ceramic matrix grain boundaries and the majority of the submicron particles; wherein a majority of the submicron particles are occluded in the ceramic matrix grains. Optionally, the intergranular film thickness is between 0.5 and 3 nanometer. Optionally, the intergranular film thickness is between 1 and 2 nanometer. Optionally, the at least one dopant is characterized by its ability to affect the location of the submicron particles within the ceramic matrix during the manufacturing process of the ceramic nanocomposite. Optionally, the at least one dopant is selected from a group of Si and Ca. Optionally, the ceramic matrix is alumina. Optionally, the alumina matrix comprises a microstructure of alumina grains with average grain larger than 0.5 micron. Optionally, the submicron particles are selected from a group of SiC, $Si_3N_4$, mullite, $TiO_2$, $ZrSiO_4$, TiC, $B_4C$, or a combination thereof.

In one embodiment, a method for manufacturing a ceramic nanocomposite, comprising: receiving a fired green ceramic body comprising ceramic matrix; introducing to the fired green ceramic body submicron particles; and introducing at least one type of location-controlling dopant at an amount that is sufficient to cover the majority of the ceramic matrix grain boundaries, as well as the majority of the interfaces between the submicron particles and the ceramic matrix grains but less than an amount that would result in a concentration that exceeds the bulk solubility limit of the location-controlling dopant ions in the ceramic matrix, at the ceramic nanocomposite sintering temperature. Optionally, the amount of the location-controlling dopant is enough to form an equilibrium adsorption layer at the ceramic matrix grain boundaries and at the interface between the submicron particle and the ceramic matrix. Optionally, the method further comprises drying the fired green ceramic body after the step of introducing the submicron particles and the location-controlling dopant. Optionally, the method further comprises sintering the fired green ceramic body after the step of drying the fired green ceramic body. Optionally, the method further comprises sintering the fired green ceramic body while controlling the oxygen partial pressure in the sintering atmosphere. Optionally, the method further comprises at least one infiltration of a solution containing the submicron particles into the fired green ceramic body. Optionally, the method further comprising evaporating the solvent and exposing the infiltrated ceramic matrix to a predefined atmosphere to affect the solute. Optionally, the solute is reduced to form a metal in a low oxygen partial pressure atmosphere. Optionally, the solute is decomposed to form a metal nitride in a nitrogen atmosphere. Optionally, the solute is decomposed to form metal carbide in a carbon atmosphere. Optionally, the solute is decomposed to form a metal oxide in an oxygen atmosphere. Optionally, the solute material comprises more than one type of metal. Optionally, the solute is decomposed to form intermetallics in a low oxygen partial pressure atmosphere.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

In the following description, numerous specific details are set forth. However, the embodiments of the invention may be practiced without some of these specific details. In other instances, well-known materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Also herein, flow diagrams illustrate non-limiting embodiment examples of the methods. The use of repeated reference numerals and/or letters in the text and/or drawings is for the purpose of simplicity and clarity and does not in itself dictate a relationship between the various embodiments and/or configurations discussed. Furthermore, methods and mechanisms of the embodiments will sometimes be described in singular form for clarity. However, some embodiments may include multiple iterations of a method or multiple instantiations of a mechanism unless noted otherwise. For example, when a controller or an interface are disclosed in an embodiment, the scope of the embodiment is intended to also cover the use of multiple controllers or interfaces.

The term "multiple junction" as used herein, refers to a grain boundary line (a point in the two dimensional drawings) formed by a joint of at least three grains.

The terms "fired green body" and "fired green ceramic body" as used herein, refer to a powder, such as alumina or boron carbide, which after consolidation or drying is heat treated to form physical contact points, e.g. necking, between the ceramic grains.

The density does not change significantly due to the thermal annealing process, however; the contact points between the grains provide enough mechanical strength for handling and infiltration of a liquid solution, without damaging the part.

The term "location-controlling dopant" as used herein, refers to material that when added in small amounts to a ceramic nanocomposite, during the manufacturing process of the particle and/or the matrix materials and/or the ceramic nanocomposite, affects the ability to control the location of the majority of submicron particles within the ceramic matrix. In one example, the location-controlling dopant is Mg or MgO and the submicron particles are Ni.

In many of the disclosed embodiments, the amount of location-controlling dopant that is added to the ceramic nanocomposite should form approximately one monolayer of coverage at the ceramic matrix grain boundaries and at the interfaces between the submicron particles and the ceramic matrix grains. In one embodiment, the amount of location-controlling dopant is estimated by estimating the total surface area of the ceramic matrix grain boundaries and the surface area of the submicron particles, based on a selected geometric model that includes the size and shape of the sintered grains and submicron particles. In one example, the amount of dopant atoms can be estimated using a first order approximation model, assuming the grain and particle shape are spherical and given the measured average of the sintered ceramic matrix grain and submicron particle size. In one example, the total surface area of the ceramic matrix grain boundaries and the surface area of the submicron particles can be estimated with higher precision based on measurements of the sintered ceramic matrix grain and submicron particle size distribution and shape. A monolayer can be estimated as the number of available sites on a crystallographic plane for the dopant species. In one example, a monolayer of Mg at alumina grain boundaries is estimated to be between 5 and 20 atoms/nm$^2$. In another example, a monolayer of Mg at alumina grain boundaries is estimated to be about 10 atoms/nm$^2$.

In one embodiment, submicron reinforcing particles and at least one location-controlling dopant are introduced to a fired green body by infiltration of a solution containing compounds. In another embodiment, the submicron reinforcing particles and at least one location-controlling dopant are introduced by powder mixing or oxide reduction. In still another example, the submicron reinforcing particles and at least one location-controlling dopant are introduced into the slip, which is a suspension of ceramic particles in a liquid medium.

The compounds in the fired green bodies can then be reduced or decomposed prior to sintering of the green body containing the submicron reinforcing particles and the location-controlling dopant/s. An exemplary nanocomposite ceramic, and in particular alumina, was prepared by dispersion into the ceramic matrix of one or more metal submicron-particles, such as Ni, or intermetallic submicron-particles.

In one example, the submicron particles (Ni nitrate) and a location-controlling dopant (Mg nitrate) were introduced by infiltration into fired alumina green bodies followed by reduction of the compound and sintering. In another example, the fired alumina green bodies can be decomposed prior to sintering. Additional infiltration and reduction or decomposition stages can increase the total number of particles introduced into the ceramic matrix. In one example, after infiltration of the solution containing the material compound which will eventually form the submicron-particles, the solvent (e.g. water) was evaporated, and the infiltrated ceramic matrix was exposed to an atmosphere of hydrogen, or a low partial pressure of oxygen, and the solute was reduced to form a metal or an intermetallic if more than one type of metal ion was in the solution. In another example, the atmosphere was nitrogen-based, the solute reacted with the nitrogen to form a nitride. In another example, the atmosphere can be carbon rich, and the solute will form a carbide. In another example, the atmosphere can be oxygen rich and the solute will form into an oxide particle.

The location-controlling dopant/s may also affect the sintering temperature-time profile, and the resulting densification of the final sintered part. In one embodiment, the sintering temperature of an alumina ceramic matrix doped with Mg is lower (1300° C. to 1500° C.) than the sintering temperature of a similar monolithic alumina while its density increases.

The methods disclosed above provide enhancement of the mechanical properties, for example, higher strength and higher wear resistance, of a nanocomposite by controlling the location of particles in an orderly way along the grain boundaries, at multi-grain boundaries or within the grains forming the ceramic microstructure.

Figure 1:
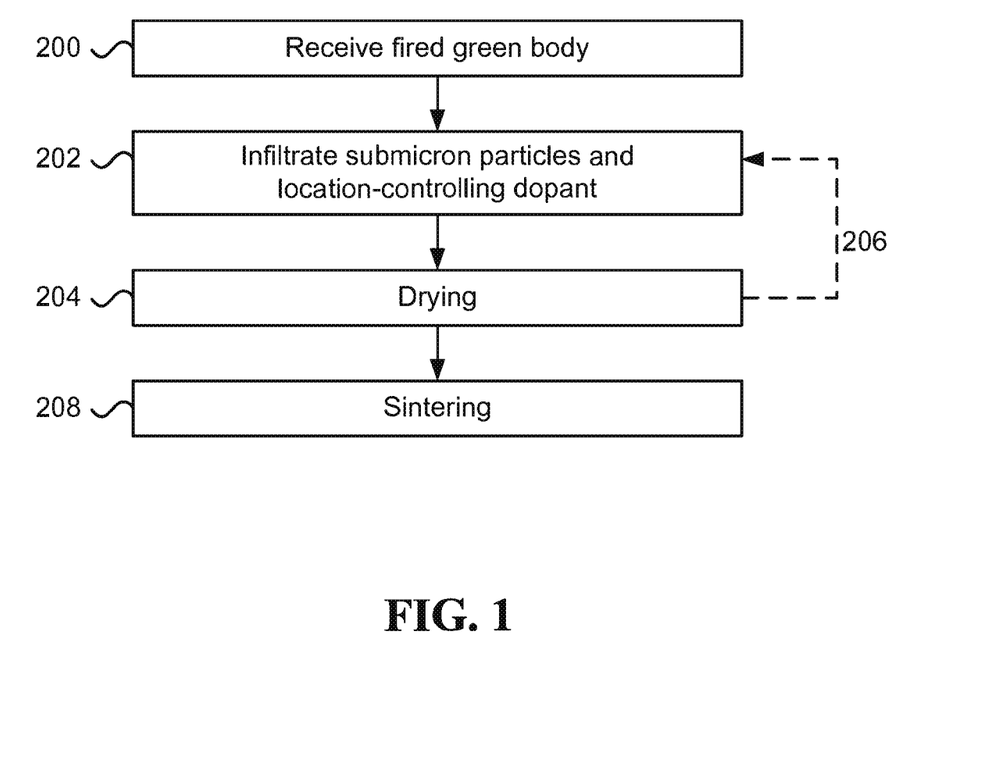
FIG. 1 is a flow diagram of one embodiment of the invention.

FIG. 1 illustrates one embodiment of a method for manufacturing a ceramic nanocomposite reinforced with submicron particles, comprising the following steps: In step 200, receiving a fired green body. In one example, the received green body was fired for one to four hours at a temperature of 900 to 1300° C. in an ambient air atmosphere or in controlled gas atmosphere. In step 202, introducing submicron particles and location-controlling dopants into the fired green body by infiltration. In one example, the fired green body was infiltrated by a solution containing a dissolved compound/s that entered the open pores of the green body. In one example, the infiltration was performed at an elevated temperature to reduce the contact angle of the solution in contact with the ceramic green body. In one example, infiltration was conducted without heating. In one example, vacuum was used to remove residual air pockets from the alumina green body and/or to increase the rate of liquid penetration into the green body. In one example both heat and vacuum were used. In one example, an alumina fired green body was placed in a water-based Ni nitrate solution: Ni(NO$_3$)*6H$_2$O at 10 to 50 wt. % Ni nitrate. The infiltration process was conducted in vacuum (about 10$^{-2}$ to 10$^{-6}$ torr) for about two to twelve hours. In step 204, drying the resulting ceramic nanocomposite. In one example, the drying is performed at ambient conditions. In another example, the drying is performed at elevated temperatures. In one example, the alumina green body was taken out of the Ni nitrate water-based solution and dried in air at room temperature for about four to sixteen hours, and then further dried at 50° C. to 150° C. for five hours in air. In another example, an alumina green body was heated to 60° C. for 2 hours, then taken out of the Ni nitrate water-based solution, dried in air at room temperature for about four to sixteen hours, and then further dried at 50° C. to 150° C. for five hours in air. In other examples, the drying process was accelerated by heating and or by using vacuum, or by first freezing and then subliming the solution (e.g. freeze-drying). In one example, the drying process is accelerated by heating, which increases the evaporation rate of the solution without boiling. Optionally, the alumina green bodies are reduced to form Ni submicron particles at 100 to 1100° C. in a forming gas atmosphere containing Ar and H$_2$ for 30 minutes to six hours. In another example, the reduction is conducted in vacuum with a low partial pressure of oxygen; in another example the reduction was conducted in a N$_2$ atmosphere. In other example, the reduction is conducted in an Ar+H$_2$ or CO and CO$_2$ atmospheres. Optionally, the infiltration and reduction processes may be repeated multiple times in order to introduce an additional amount of Ni submicron-particles. In another example, rather than reducing the compound prior to a subsequent infiltration step designed to increase the total amount of particles, the compound is thermally decomposed in air to form an oxide.

In optional step 206, repeating the infiltration and drying steps as needed. In one example, multiple infiltrations combined with varying drying techniques were applied to increase the amount of compound or compounds in the green body. In one example, additional amounts of at least one compound are introduced using a single infiltration-drying step by increasing the concentration of the dissolved by at least one compound in the solution. In one example, the repeated infiltration and drying steps involve different compounds and/or different drying techniques. And in step 208, sintering the dried ceramic nanocomposite, resulting in a controlled nanocomposite microstructure. In one example, the sintering temperature ranges from 1200° C. to 1800° C. In one example the sintering temperature is about 1400° C. for four hours in an He atmosphere. In another example, the sintering atmosphere is $H_2$, or a combination of He and $H_2$.

Figure 2:
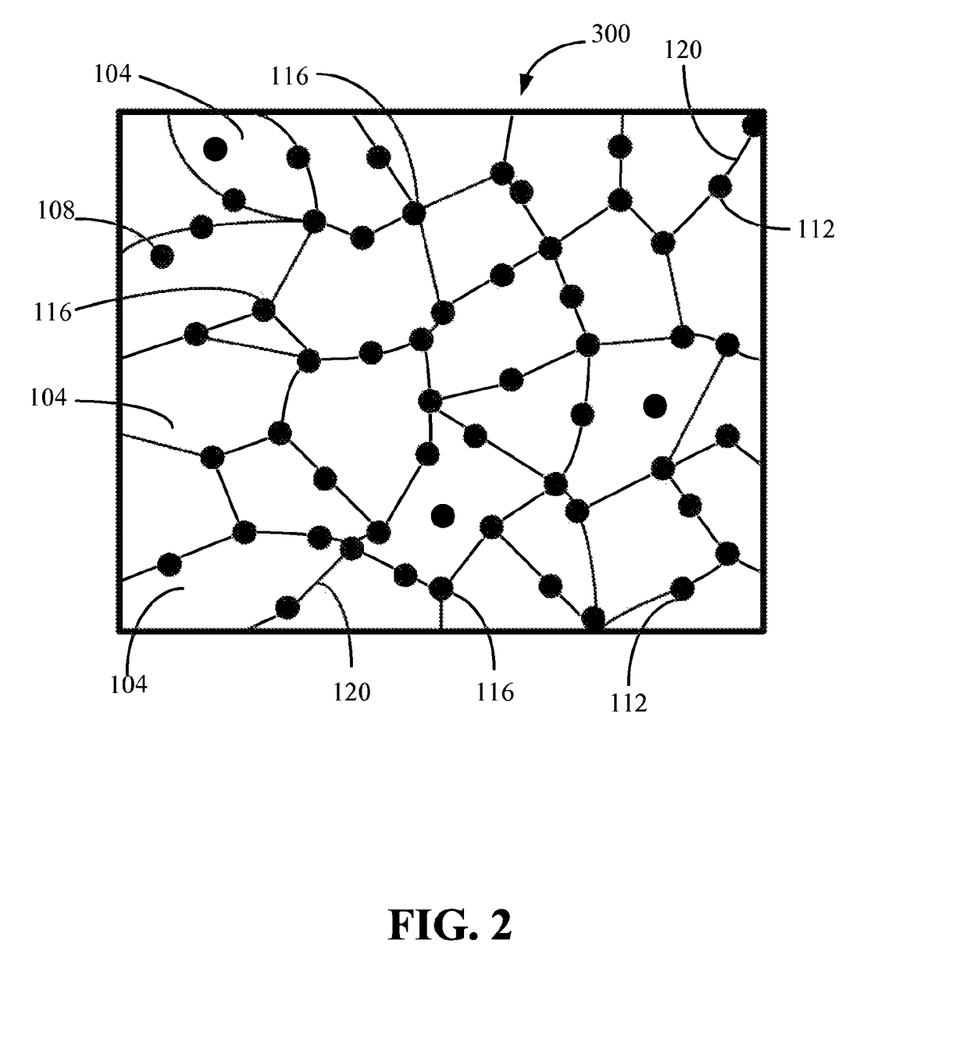
FIG. 2 is a schematic illustration of one embodiment of a ceramic nanocomposite reinforced by submicron particles having a CTE larger than the CTE of the matrix.

FIG. 2 is a schematic illustration of a ceramic nanocomposite, reinforced by submicron-particles with a CTE larger than the CTE of the matrix material. The microstructure manufactured according to the present process resulted in most of the submicron particles being located at the grain boundaries and multiple boundary junctions. In an exemplary embodiment of a sintered alumina matrix 300 with a microstructure of grains 104 separated by grain boundaries 120 with average ceramic matrix grains larger than 0.5 micron diameter and reinforcing submicron Ni particles 108 that are primarily, 60% or more, located at multiple boundary junctions 116 and grain boundaries 112. A non-negligible percentage of Ni submicron particles 108 are occluded in the alumina grains 104. For example, between 2% and 20% of the Ni submicron particles 108 are occluded in the alumina grains 104. And the submicron particle size was between 5 and 1000 nanometers, with an average of 200 nanometers, and their concentration was between 0.5 vol.% to 10 vol.%.

The sintering temperature-time profile may also affect the amount of occluded submicron Ni particles. In one example, sintering at 1400° C. for four hours resulted in 3% of occluded submicron Ni particles. In a o example, after 7 hours at 1400° C., 14% of the submicron Ni particles were occluded. In a third example, sintering at 1600° C. for four hours resulted in 30% of the submicron Ni particles being occluded. Limiting occlusion at higher sintering temperatures and increased duration may be achieved by increasing the amount of location-controlling dopant/s that affects ceramic matrix grain boundary velocity, such that the ceramic matrix grain boundary velocity does not exceed that of the submicron particle velocity.

Similar ceramic nanocomposite reinforcement with submicron-particles can be obtained by reinforcing the ceramic matrix with submicron-particles selected from a group of metals comprising one of Ni, Ti, Fe, Cu, Cr, Pt, or intermetallic submicron particles such as TiNi, NiAl, TiAl, $NiAl_2O_4$, or a combination of materials with a coefficient of thermal expansion greater than that of the matrix ceramic.

In one example, helium was used as the sintering atmosphere due to its high diffusivity. In another example, sintering was conducted in air to create Ni-spinel ($NiAl_2O_4$) particles. In other examples the sintering atmosphere is modified in order to modify the colors of the sintered ceramic nanocomposites.

In order to limit crack formation, the heating and cooling rates for all sintering conditions were between 5 and 30° C./min. In one example the fired green bodies were sintered in a graphite crucible. In other examples, the fired green bodies were sintered in an alumina crucible or using an alumina stage.

Figure 3:
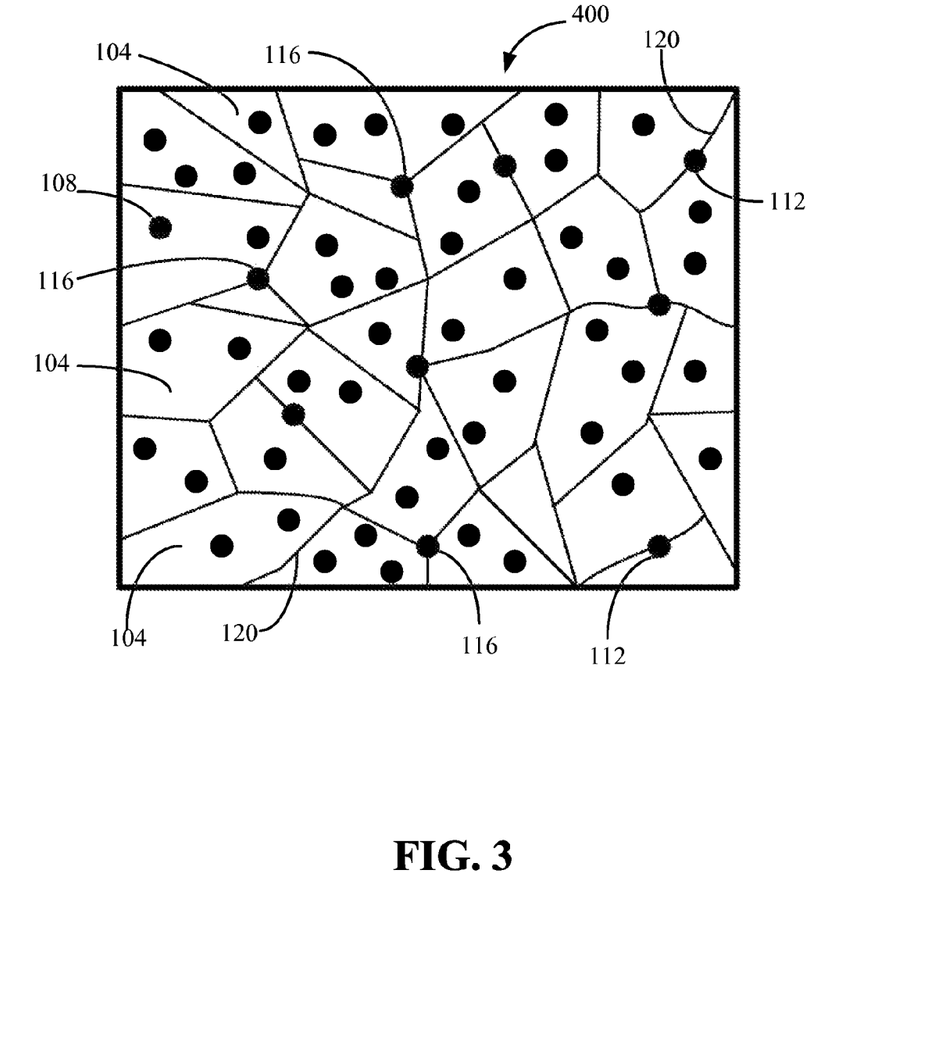
FIG. 3 is a schematic illustration of one embodiment of a ceramic nanocomposite reinforced by submicron particles having a CTE smaller than the CTE of the matrix.

FIG. 3 illustrates one embodiment of ceramic nanocomposite reinforced by submicron particles with a CTE less than the CTE of the ceramic matrix. Microstructure 400 comprises particles 108 that are occluded within the ceramic grains 104. In one example, the mechanical properties of the ceramic nanocomposite, such as strength and wear resistance, are enhanced by occluding the particles within the matrix grains. In a first example at least 60%, and in a second example at least 75%, of the submicron particles are occluded in the matrix grains. In one example, Si is added to an alumina matrix to promote occlusion of Mo particles. In another example, oxygen is added via a high partial pressure of oxygen in the sintering atmosphere to promote occlusion of SiC particles in alumina grains. In another example Ca is added to promote occlusion of W particles in alumina matrix grains.

Figure 4:
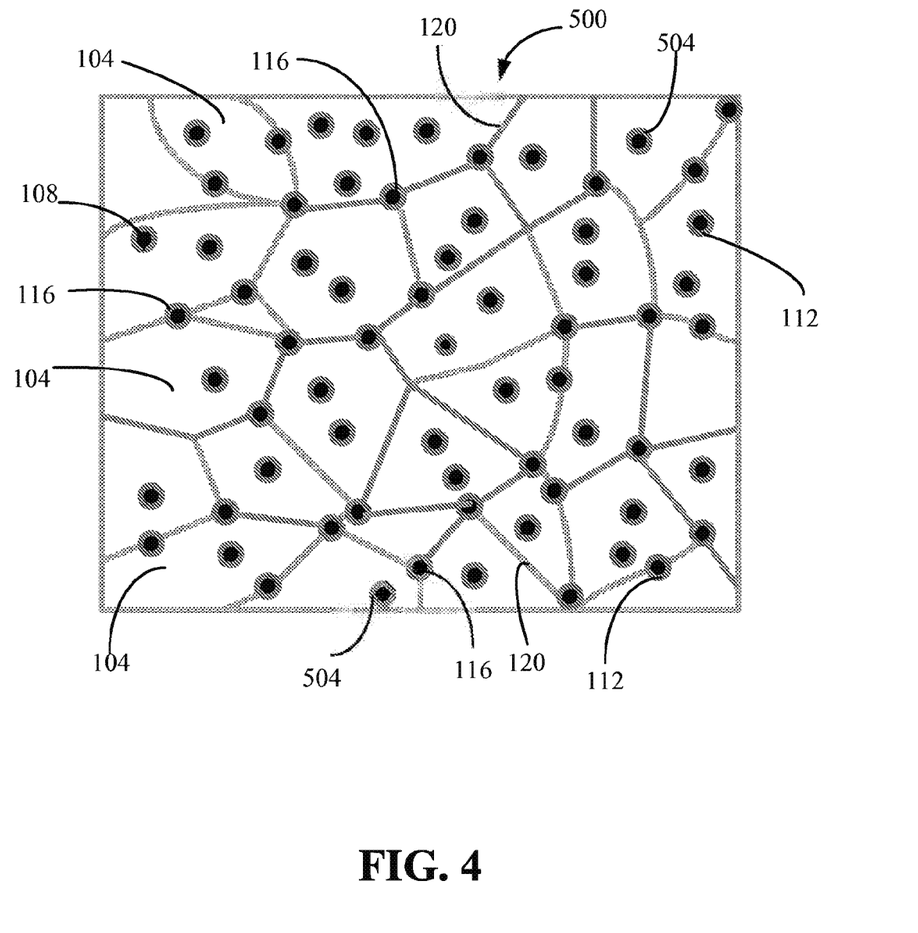
FIG. 4 is a schematic illustration of one embodiment of a ceramic nanocomposite reinforced by submicron particles having a CTE smaller than the CTE of the matrix in the presence of an intergranular film.

FIG. 4 illustrates one embodiment of ceramic nanocomposite 500 reinforced by submicron particles with a CTE less than the CTE of the ceramic matrix, in the presence of an intergranular film (IGF) 504. In one example, the mechanical properties of the ceramic nanocomposite, such as strength and wear resistance, are enhanced by occluding the particles within the matrix grains. In a first example at least 60%, and in a second example at least 75%, of the submicron particles are occluded in the matrix grains. In one example, Si and Ca are added to an alumina matrix reinforced with submicron W particles. In another example, Si and Ca are added to an alumina matrix reinforced with submicron Mo particles. In another example, Si and Ca are added to an alumina matrix reinforced with submicron mullite ($3Al_2O_3$-$2SiO_2$) particles. In another example Si, Ca and Mg are added to an alumina matrix reinforced with submicron W particles.

The following example describes a cost effective nanocomposite ceramics manufacturing process, according to the above described process.

EXAMPLE

Ni in Alumina

A metal reinforced ceramic nanocomposite was prepared by properly locating 2.5 wt. % submicron Ni particles in alumina. The Ni particles were introduced by infiltration of a Ni nitrate water-based solution into the fired alumina green body (at 850° C.), containing Mg at a concentration of approximately 130 ppm. The water-based solution had a 30/70 wt. % ratio of Ni-nitrate to water. For degassing, the green bodies were placed in a dissector (made by Narang Scientific Industries), for seven hours at a negative pressure of about $10^{-2}$ torr. In order to reduce the contact angle to less than 50°, the fired green bodies were immersed in metal salt solution (Ni-nitrate) and the system was heated and maintained at a temperature of 60° C. for about two hours. The infiltrated green bodies were naturally dried, initially in ambient, and after 2 to 8 hours placed in a drying furnace (M.R.C. DK-800WT-250° C., 240L SS chamber) at 110° C. for five hours in an air environment to remove residual water. After drying, the green bodies were transferred into a reduction furnace (Therm Craft LTD Horizontal Solid Tube Furnace 1200° C.) with a forming gas atmosphere containing 93% Ar and 7% of $H_2$. The reduction process continued for two hours at a temperature of 600° C. The heating rate of the furnace was approximately 10° C./min; the cooling rate was approximately 5° C./min.

Following the reduction process, the green bodies were immersed in the Ni nitrate water-based solution with a 1/1 Ni-nitrate-to-water ratio, for a second infiltration process. The fired green bodies in the metal salt solution were heated to 60° C. for two hours, until the contact angle was found to be lower than 500. The salt solution infiltrated green bodies were dried and placed in a furnace with ambient air atmosphere for five hours at 110° C. The dried green bodies were placed in a reduction furnace with a forming gas containing 93% Ar and 7% of $H_2$. The reduction process parameters, temperature and time, were 600° C. for two hours. The heating rate of the furnace was approximately 10° C./min; the furnace cooling rate was approximately 5° C./min.

For sintering, the green bodies were placed in a graphite crucible and sintered for four hours in a furnace (Thermal Technology Inc. 1000-4560-FP20 graphite furnace) at a sintering temperature of 1400° C. in a He atmosphere.

The process produced a ceramic nanocomposite with 95% of the theoretical density and 3% occluded Ni particles. The average Ni particle size was about 200 nm and the average matrix grain size was about 850 nm. The average three point bending strength was about 650 MPa, and the Weibull probability function was about 13.

In one embodiment, the concentration of the occluded submicron particles within the ceramic matrix grains is limited by at least one type of location-controlling dopant that reduces the ceramic matrix grain boundary velocity relative to the velocity of the submicron particles. In another embodiment, the concentration of the occluded submicron particles within the ceramic matrix grains is limited by at least one type of location-controlling dopant that increases the velocity of the submicron particles relative to the velocity of the ceramic matrix grain boundaries. In both embodiments, the amount of location-controlling dopant added is sufficient to create approximately a monolayer of excess at the ceramic matrix grain boundaries and at the interfaces between the submicron particles and the ceramic matrix grains, but less than an amount that would result in a concentration that exceeds the bulk solubility limit of the location-controlling dopant ions in the ceramic matrix, at the ceramic nanocomposite sintering temperature. In both embodiments, Mg is added by introducing Mg-nitrate, MgO, or any other method known in the art, into the alumina nanocomposite.

In one example, in a Ni reinforced alumina nanocomposite, wherein the Ni CTE is larger than the CTE of the alumina matrix, Mg is added to limit Ni occlusion in the alumina grains. Mg is added, as a location-controlling dopant, in sufficient amounts to form approximately a monolayer of excess at the alumina grain boundaries and at the Ni-alumina interfaces, but less than an amount that would result in a concentration that exceeds the bulk solubility limit of Ni in alumina at the sintering temperature.

In one embodiment, a method for manufacturing a reinforced ceramic nanocomposite, with submicron particles includes the following steps:

Receiving a fired green ceramic body having grain diameter between 0.5 and 5 micron, and an average grain diameter between 1.5 and 2.5 micron.

Introducing at least one type of submicron location-controlling dopant at an amount that is sufficient to cover the majority of the ceramic matrix grain boundaries, and the interface surfaces between the submicron particles and the matrix grains, but less than an amount that would result in a concentration that exceeds the bulk solubility limit of the location-controlling dopant ions in the ceramic matrix, at the ceramic nanocomposite sintering temperature.

In one example, the majority is more than 95%, of the ceramic matrix grain boundaries, and the interface surfaces between the submicron particles and the matrix grains. In another example, it is more than 99% of the ceramic matrix grain boundaries, and the interface surfaces between the submicron particles and the matrix grains Introducing the submicron particles to the fired green ceramic body, wherein the submicron particle diameter is between 5 and 500 nanometers, with an average particle diameter between 150 and 250 nanometers. In one example, the volumetric concentration of the submicron particles is approximately between 0.5 and 10 vol.%. In another example, the volumetric concentration of the submicron particles is approximately between 4 and 6 vol.%. The submicron particles are uniformly dispersed in the matrix microstructure.

Optionally, drying the infiltrated fired green body. And optionally, sintering the infiltrated fired green body.

The following examples refer to the above described method for manufacturing a ceramic nanocomposite:

In one example, alumina, having a CTE between 6 to 9 ppm/° K, is reinforced with submicron Ni particles, having a CTE of approximately 13 ppm/° K. The location-controlling dopant, Mg, is added by introducing Mg-nitrate into the alumina; the location-controlling dopant is at a concentration of between 2,500 and 5,000 ppm; the solubility limit of Mg in alumina is approximately 130 ppm, at 1600° C., and approximately 100 to 160 ppm for sintering temperatures of 1400 to 1700° C.

In a variation of this example, the average Ni particle diameter is about 200 nanometers, the CTE of the alumina is about 8 ppm/° K, the average alumina grain diameter is about 2 microns, and the concentration of the location-controlling dopant is approximately 3400 ppm.

In one example, alumina, having a CTE between 6 to 9 ppm/° K, is reinforced with submicron Fe particles, having a CTE of approximately 11 ppm/° K. The location-controlling dopant, Mg, is added by introducing Mg-nitrate into the alumina; the location-controlling dopant is at a concentration of between 1,000 and 4,000 ppm; the solubility limit of Mg in alumina is approximately 130 ppm, at 1600° C., and approximately 100 to 160 ppm for sintering temperatures of 1400 to 1700° C.

In a variation of this example, the average Fe particle diameter is about 250 nanometers, the CTE of the alumina is about 8 ppm/° K, the average alumina grain diameter is about 2 microns, and the concentration of the location-controlling dopant is approximately 1,800 ppm.

In one example, alumina, having a CTE between 6 to 9 ppm/° K, is reinforced with submicron Cu particles, having a CTE of approximately 17 ppm/OK. The location-controlling dopant, Mg, is added by introducing Mg-nitrate into the alumina; the location-controlling dopant is at a concentration of between 500 and 3,000 ppm; the solubility limit of Mg in alumina is approximately 130 ppm, at 1600° C., and approximately 100 to 160 ppm for sintering temperatures of 1400 to 1700° C.

In a variation of this example, the average Cu particle diameter is about 300 nanometers, the CTE of the alumina is about 8 ppm/° K, the average alumina grain diameter is about 2 microns, and the concentration of the location-controlling dopant is approximately 1100 ppm.

In one example, alumina, having a CTE between 6 to 9 ppm/° K, is reinforced with submicron heat resistant steel 21-4N particles, having a CTE of approximately 18 ppm/° K. The location-controlling dopant, Mg, is added by introducing Mg-nitrate into the alumina; the location-controlling dopant is at a concentration of between 2,500 and 5,000 ppm; the solubility limit of Mg in alumina is approximately 130 ppm, at 1600° C., and approximately 100 to 160 ppm for sintering temperatures of 1400 to 1700° C.

In a variation of this example, the average heat resistant steel 21-4N particle diameter is about 200 nanometers, the CTE of the alumina is about 8 ppm/° K, the average alumina grain diameter is about 2 microns, and the concentration of the location-controlling dopant is approximately 3400 ppm.

In one example, alumina, having a CTE between 6 to 9 ppm/° K, is reinforced with submicron TiAl intermetallic particles, having a CTE between 11 and 14 ppm/° K. The location-controlling dopant, Mg, is added by introducing Mg-nitrate into the alumina; the location-controlling dopant is at a concentration of between 500 and 3,000 ppm; the solubility limit of Mg in alumina is approximately 130 ppm, at 1600° C., and approximately 100 to 160 ppm for sintering temperatures of 1400 to 1700° C.

In a variation of this example, the average TiAl intermetallic particle diameter is about 300 nanometers, the CTE of the alumina is about 8 ppm/° K, the average alumina grain diameter is about 2 microns, and the concentration of the location-controlling dopant is approximately 1100 ppm.

In one example, alumina, having a CTE between 6 to 9 ppm/° K, is reinforced with submicron Ti-6Al-4V intermetallic particles, having a CTE of approximately 11 ppm/° K. The location-controlling dopant, Mg, is added by introducing Mg-nitrate into the alumina; the location-controlling dopant is at a concentration of between 1,000 and 4,000 ppm; the solubility limit of Mg in alumina is approximately 130 ppm, at 1600° C., and approximately 100 to 160 ppm for sintering temperatures of 1400 to 1700° C.

In a variation of this example, the average Ti-6Al-4V intermetallic particle diameter is about 250 nanometers, the CTE of the alumina is about 8 ppm/° K, the average alumina grain diameter is about 2 microns, and the concentration of the location-controlling dopant is approximately 1800 ppm.

In one example, alumina, having a CTE between 6 to 9 ppm/° K, is reinforced with submicron Ni-spinel ($NiAl_2O_4$) particles, having a CTE of approximately 10 ppm/° K. The location-controlling dopant, Mg, is added by introducing Mg-nitrate into the alumina; the location-controlling dopant is at a concentration of between 6,000 and 10,000 ppm; the solubility limit of Mg in alumina is approximately 130 ppm, at 1600° C., and approximately 100 to 160 ppm for sintering temperatures of 1400 to 1700° C.

In a variation of this example, the average Ni-spinel particle diameter is about 150 nanometers, the CTE of the alumina is about 8 ppm/° K, the average alumina grain diameter is about 2 microns, and the concentration of the location-controlling dopant is approximately 7,700 ppm.

In one example, alumina, having a CTE between 6 to 9 ppm/° K, is reinforced with submicron yttrium stabilized $ZrO_2$ particles, having a CTE of approximately 10 ppm/° K. The location-controlling dopant, Mg, is added by introducing Mg-nitrate into the alumina; the location-controlling dopant is at a concentration of between 2,500 and 5,000 ppm; the solubility limit of Mg in alumina is approximately 130 ppm, at 1600° C., and approximately 100 to 160 ppm for sintering temperatures of 1400 to 1700° C.

In a variation of this example, the average yttrium stabilized $ZrO_2$ particle diameter is about 200 nanometers, the CTE of the alumina is about 8 ppm/° K, the average alumina grain diameter is about 2 microns, and the concentration of the location-controlling dopant is approximately 3400 ppm.

In one example, SiC, having a CTE of approximately 4 ppm/° K, is reinforced with submicron Ni particles, having a CTE of approximately 13 ppm/° K. The location-controlling dopant, Mg, is added by introducing Mg-nitrate into the alumina; the location-controlling dopant is at a concentration of between 2,500 and 5,000 ppm; the solubility limit of Mg in alumina is approximately 130 ppm, at 1600° C., and approximately 100 to 160 ppm for sintering temperatures of 1400 to 1700° C.

In a variation of this example, the average Ni particle diameter is about 200 nanometers, the CTE of the SiC is about 4 ppm/° K, the average SiC grain diameter is about 2 microns, and the concentration of the location-controlling dopant is approximately 3,400 ppm.

In one example, SiC, having a CTE of approximately 4 ppm/° K, is reinforced with submicron Ni particles, having a CTE of approximately 13 ppm/° K. The location-controlling dopant, Ce; the location-controlling dopant is at a concentration of between 1,000 and 4,000 ppm.

In a variation of this example, the average Ni particle diameter is about 250 nanometers, the CTE of the SiC is about 4 ppm/° K, the average SiC grain diameter is about 2 microns, and the concentration of the location-controlling dopant is approximately 1,800 ppm.

In one example, $B_4C$, having a CTE of approximately 4 ppmP/K, is reinforced with submicron Ni particles, having a CTE of approximately 13 ppmP/K. The location-controlling dopant, Si, is added by introducing $SiO_2$ into the $B_4C$, were the location-controlling dopant is at a concentration of between 2,500 and 5,000 ppm.

In a variation of this example, the average Ni particle diameter is about 200 nanometers, the CTE of the $B_4C$ is about 4 ppm/° K, the average $B_4C$ grain diameter is about 2 microns, and the concentration of the location-controlling dopant is approximately 3,400 ppm.

In one embodiment, the concentration of the occluded submicron particles within the ceramic matrix grains is promoted by at least one type of location-controlling dopant that increases the ceramic matrix grain boundary velocity relative to the velocity of the submicron particles. In another embodiment, the concentration of the occluded submicron particles within the ceramic matrix grains is promoted by at least one type of location-controlling dopant that reduces the velocity of the submicron particles relative to the velocity of the ceramic matrix grain boundaries. In both embodiments, the amount of location-controlling dopant added is sufficient to create approximately a monolayer of excess at the ceramic matrix grain boundaries and at the interfaces between the submicron particles and the ceramic matrix grains, but less than an amount that would result in a concentration that exceeds the bulk solubility limit of the location-controlling dopant ions in the ceramic matrix, at the ceramic nanocomposite sintering temperature.

In one embodiment, the concentration of the occluded submicron particles within the ceramic matrix grains is promoted by at least one type of location-controlling dopant that forms an intergranular film (IGF) at the ceramic matrix grain boundaries, at multiple junctions and at the interfaces between the submicron particles and the ceramic matrix grains interfaces. The amount of location-controlling dopant added is sufficient to create an IGF that, in one example, is between 0.5 and 3 nanometer and in another example, between 1 and 2 nanometer thick. The IGF increases the ceramic matrix grains boundary velocity relative to the velocity of the particles, leading to detachment of the reinforcing submicron particles and their occlusion within the matrix grains.

In one example, with a reinforced silicon nitride ($Si_3N_4$) nanocomposite, oxygen is added to form an intergranular film to promote occlusion of submicron particles within the silicon nitride. In one example, with a reinforced silicon carbide (SiC) nanocomposite, oxygen is added to form an intergranular film to promote occlusion of submicron particles within the silicon carbide matrix. In one example, with a reinforced boron carbide ($B_4C$) nanocomposite, oxygen and Si are added to form an intergranular film to promote occlusion of submicron particles within the boron carbide matrix.

In one embodiment, a method for manufacturing a reinforced ceramic nanocomposite, with submicron particles includes the following steps:

Receiving a fired green ceramic body having grain diameter between 0.5 and 5 microns, and an average grain diameter between 1.5 and 2.5 microns.

Introducing at least one type of location-controlling dopant at an amount that is sufficient to create an IGF that is approximately 1-2 nm thick, at the majority of the grain boundaries and the interfaces between the particles and the matrix grains, but without exceeding the bulk solubility limit.

In one example, the majority is more than 95%, of the grain boundaries and the interfaces between the particles and the matrix grains. In another example, it is more than 99% of the grain boundaries and the interfaces between the particles and the matrix grains.

Introducing to the fired green ceramic body the submicron particles, wherein the submicron particle diameter is between 5 and 500 nanometers, with an average particle diameter between 150 and 250 nanometers. In one example, the volumetric concentration of the submicron particles is approximately between 0.5 and 10 vol.%. In another example, the volumetric concentration of the submicron particles is approximately between 4 and 6 vol.%. The submicron particles are uniformly dispersed in the matrix microstructure.

Optionally, drying the infiltrated fired green body. And optionally, sintering the infiltrated fired green body.

The following examples refer to the above described method for manufacturing a ceramic matrix nanocomposite:

In one example, alumina, having a CTE between 6 to 9 ppm/° K, is reinforced with submicron W particles, having a CTE of approximately 4 ppm/° K. The location-controlling dopants, Si and Ca, are added by introducing $SiO_2$ and Ca-nitrate into the alumina; the location-controlling dopant is at a concentration of between 2,500 and 5,000 ppm; in equal parts.

In a variation of this example, the average W particle diameter is about 200 nanometers, the CTE of the alumina is about 8 ppm/° K, the average alumina grain diameter is about 2 microns, and the concentration of the location-controlling dopant is approximately 3,400 ppm.

In one example, alumina, having a CTE between 6 to 9 ppm/° K, is reinforced with submicron W particles, having a CTE of approximately 4 ppm/° K. The location-controlling dopants, Si and Ca, are added by introducing $SiO_2$ and Ca-nitrate into the alumina; the location-controlling dopant is at a concentration of between 1,000 and 4,000 ppm in equal parts. Also introducing Mg at an approximate concentration of 130 ppm.

In a variation of this example, the average W particle diameter is about 250 nanometers, the CTE of the alumina is about 8 ppm/° K, the average alumina grain diameter is about 2 microns, and the concentration of the location-controlling dopant is approximately 1,800 ppm.

In one example, alumina, having a CTE between 6 to 9 ppm/° K, is reinforced with submicron SiC particles, having a CTE of approximately 4 ppm/?K. The location-controlling dopants, Si and Ca, are added by introducing $SiO_2$ and Ca-nitrate into the alumina; the location-controlling dopant is at a concentration of between 500 and 3,000 ppm in equal parts.

In a variation of this example, the average SiC particle diameter is about 300 nanometers, the CTE of the alumina is about 8 ppm/K, the average alumina grain diameter is about 2 microns, and the concentration of the location-controlling dopant is approximately 1100 ppm.

In one example, alumina, having a CTE between 6 to 9 ppm/° K, is reinforced with submicron mullite particles, having a CTE of approximately 5.4 ppm/° K. The location-controlling dopants, Si and Ca, are added by introducing $SiO_2$ and Ca-nitrate into the alumina; the location-controlling dopant is at a concentration of between 2,500 and 5,500 ppm in equal parts.

In a variation of this example, the average mullite particle diameter is about 200 nanometers, the CTE of the alumina is about 8 ppm/° K, the average alumina grain diameter is about 2 microns, and the concentration of the location-controlling dopant is approximately 3,400 ppm.

In one example, alumina, having a CTE between 6 to 9 ppm/° K, is reinforced with submicron Mo particles, having a CTE of approximately 4.8 ppm/?K. The location-controlling dopants, Si and Ca, are added by introducing $SiO_2$ and Ca-nitrate into the alumina; the location-controlling dopant is at a concentration of between 1,000 and 4,000 ppm in equal parts.

In a variation of this example, the average Mo particle diameter is about 250 nanometers, the CTE of the alumina is about 8 ppm/° K, the average alumina grain diameter is about 2 microns, and the concentration of the location-controlling dopant is approximately 1,800 ppm.

In one embodiment, a method for manufacturing a reinforced ceramic nanocomposite, with submicron particles includes the following steps:

Receiving a fired green ceramic body having grain diameter between 0.5 and 5 microns, and an average grain diameter between 1.5 and 2.5 microns.

Introducing at least one type of location-controlling dopant at an amount that is sufficient to cover the majority of the ceramic matrix grain boundaries, and the interface surfaces between the submicron particles and the matrix grains, but less than an amount that would result in a concentration that exceeds the bulk solubility limit of the location-controlling dopant ions in the ceramic matrix, at the ceramic nanocomposite sintering temperature.

Introducing to the fired green ceramic body the submicron particles, wherein the submicron particle diameter is between 5 and 500 nanometers, with an average particle diameter between 150 and 250 nanometers. In one example, the volumetric concentration of the submicron particles is approximately between 0.5 and 10 vol.%. In another example, the volumetric concentration of the submicron particles is approximately between 4 and 6 vol.%. The submicron particles are uniformly dispersed in the matrix microstructure.

Optionally, drying the infiltrated fired green body. And optionally, sintering the infiltrated fired green body.

The following examples refer to the above described method for manufacturing a ceramic matrix nanocomposite:

In one example, alumina, having a CTE between 6 to 9 ppm/° K, is reinforced with submicron W particles, having a CTE of approximately 4 ppm/° K. The location-controlling dopant, Ca, is added by introducing Ca-nitrate into the alumina; the location-controlling dopant is at a total concentration of between 2,500 and 5,500 ppm.

In a variation of this example, the average W particle diameter is about 200 nanometers, the CTE of the alumina is about 8 ppm/° K, the average alumina grain diameter is about 2 microns, and the concentration of the location-controlling dopant is approximately 3,400 ppm.

In one example, alumina, having a CTE between 6 to 9 ppm/° K, is reinforced with submicron W particles, having a CTE of approximately 4 ppm/° K. The location-controlling dopant, Si, is added by introducing $SiO_2$ into the alumina; the location-controlling dopant is at a total concentration of between 2,500 and 5,500 ppm.

In a variation of this example, the average W particle diameter is about 200 nanometers, the CTE of the alumina is about 8 ppm/° K, the average alumina grain diameter is about 2 microns, and the concentration of the location-controlling dopant is approximately 3,400 ppm.

In one example, alumina, having a CTE between 6 to 9 ppm/° K, is reinforced with submicron SiC particles, having a CTE of approximately 4 ppm/° K. The location-controlling dopant, Oxygen, is introduced by controlling the Oxygen content in the sintering atmosphere; the location-controlling dopant is at a total concentration of between 2,000 and 5,000 ppm.

In a variation of this example, the average SiC particle diameter is about 200 nanometers, the CTE of the alumina is about 8 ppm/° K, the average alumina grain diameter is about 2 microns, and the concentration of the location-controlling dopant is approximately 3,200 ppm.

In one example, alumina, having a CTE between 6 to 9 ppm/° K, is reinforced with submicron mullite particles, having a CTE of approximately 5.4 ppm/° K. The location-controlling dopant, Si, is added by introducing $SiO_2$ into the alumina; the location-controlling dopant is at a total concentration of between 2,500 and 5,500 ppm.

In a variation of this example, the average mullite particle diameter is about 200 nanometers, the CTE of the alumina is about 8 ppm/° K, the average alumina grain diameter is about 2 microns, and the concentration of the location-controlling dopant is approximately 3,400 ppm.

The above described embodiments of ceramic nanocomposites may be used for ceramic armor for personal, vehicle, air borne, and/or seafaring vessels applications, by itself or in a combination with other materials and structures. The above described embodiments of ceramic nanocomposites may also be used for manufacturing tools and parts requiring high strength and or high wear resistance, such as cutting tools, for example: metal and wood working consumables; in automation, automotive and aviation, fiction components and parts such as brake disks; in medical applications such as medical devices and consumables, dental prosthesis, implants and abutments, orthopedic hip and spine inserts. Additional applications include chucks for semiconductor manufacturing, pickup tools, milling balls, parts subject to high friction such as, extrusion dies, seals and rings, and others.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

The embodiments are not limited in their applications to the details of the order or sequence of steps of operation of methods, or to details of implementation of devices, set in the description, drawings, or examples.

While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. For example, in many of the embodiments, the location-controlling dopants may be added before, with, or after the submicron particles.

While the embodiments have been described in conjunction with specific examples thereof, it is to be understood that they have been presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A method for manufacturing a ceramic nanocomposite, comprising:
   receiving a fired green ceramic body comprising a ceramic matrix;
   introducing to the fired green ceramic body submicron particles having coefficient of thermal expansion lower than the coefficient of thermal expansion of the ceramic matrix;
   introducing at least one type of location-controlling dopant at an amount that is sufficient to cover the majority of the ceramic matrix grain boundaries; and
   drying the fired green ceramic body after introducing the submicron particles and the location-controlling dopant.

2. The method of claim 1, wherein the amount of the at least one type of location-controlling dopant does not result in a concentration that exceeds the bulk solubility limit of the location-controlling dopant ions in the ceramic matrix, at the ceramic nanocomposite sintering temperature.

3. The method of claim 1, introducing to the fired green ceramic body the submicron particles is done by infiltration of a solution containing compounds that form the submicron particles.

4. The method of claim 1, further comprising sintering the fired green ceramic body after the step of drying the fired green ceramic body.

5. The method of claim 1, wherein the volumetric concentration of the submicron particles is between 0.5 vol. % and 10 vol. %.

6. The method of claim 1, wherein the amount of the at least one type of location-controlling dopant is sufficient to create an intergranular film (IGF) that covers the majority of the ceramic matrix grain boundaries and the majority of the submicron particles.

7. A ceramic nanocomposite comprising:
   a ceramic matrix with submicron particles dispersed in the ceramic matrix, the submicron particles having a coefficient of thermal expansion lower than the coefficient of thermal expansion of the ceramic matrix; and
   at least one dopant that covers the majority of the ceramic matrix grain boundaries, at a concentration that does not exceed the bulk solubility limit of the dopant in the ceramic matrix at the ceramic nanocomposite sintering temperature, wherein a majority of the submicron particles are occluded in the ceramic matrix grains.

8. The ceramic nanocomposite of claim 7, wherein the at least one dopant is characterized by its ability to affect the location of the submicron particles within the ceramic matrix during the manufacturing process of the ceramic nanocomposite.

9. The ceramic nanocomposite of claim 7, wherein the at least one dopant is silica (Si) or Calcium (Ca).

10. The ceramic nanocomposite of claim 7, wherein the ceramic matrix is alumina.

11. The ceramic nanocomposite of claim 7, wherein the ceramic matrix is selected from a group of SiC, $Si_3N_4$ and $B_4C$, and the at least one dopant is oxygen.

12. The ceramic nanocomposite of claim 7, wherein the submicron particles are selected from W, Mo, SiC, $Si_3N_4$, mullite, $TiO_2$, $ZrSiO_4$, TiC, $B_4C$ or any combination thereof.

13. The ceramic nanocomposite of claim 7, wherein the at least one dopant being at an amount that is sufficient to cover the majority of the ceramic matrix grain boundaries and the majority of interfaces between the submicron particles and the ceramic matrix grains.

14. The ceramic nanocomposite of claim 7, wherein the at least one dopant being at an amount that is sufficient to create an equilibrium excess of the dopant at the ceramic matrix grain boundaries and at interfaces between the submicron particles and the ceramic matrix grains, without exceeding a bulk solubility limit of the dopant in the ceramic matrix at a ceramic nanocomposite sintering temperature.

15. The ceramic nanocomposite of claim 7, wherein the at least one dopant being at an amount that is sufficient to create an intergranular film that covers the majority of the ceramic matrix grain boundaries and the majority of the submicron particles.

16. The ceramic nanocomposite of claim 7, wherein the intergranular film thickness is between 0.5 and 3 nanometer.

17. An article comprising the ceramic nanocomposite of claim 7.

18. The article of claim 17, wherein the article is a cutting tool, a dental prosthesis, a ceramic armor, a friction component or a medical device.

19. An article comprising a ceramic nanocomposite manufactured according to claim 1.

20. The article of claim 19, wherein the article is a cutting tool, a dental prosthesis, a ceramic armor, a friction component or a medical device.

* * * * *